(12) United States Patent
Chu et al.

(10) Patent No.: US 10,884,462 B2
(45) Date of Patent: Jan. 5, 2021

(54) COMPUTER CASING

(71) Applicant: Wistron Corp., New Taipei (TW)

(72) Inventors: Chia Hua Chu, New Taipei (TW); Chih Peng Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 526 days.

(21) Appl. No.: 15/643,435

(22) Filed: Jul. 6, 2017

(65) Prior Publication Data
US 2018/0260004 A1    Sep. 13, 2018

(30) Foreign Application Priority Data

Mar. 9, 2017 (TW) .............................. 106107766 A (51) Int. Cl.
*G06F 1/18* (2006.01)
*E05B 65/52* (2006.01)
*G06F 21/88* (2013.01)

(52) U.S. Cl.
CPC .......... *G06F 1/182* (2013.01); *E05B 65/5223* (2013.01); *G06F 1/181* (2013.01); *G06F 21/88* (2013.01)

(58) Field of Classification Search
CPC ............. E05B 73/0082; E05B 73/0005; E05B 67/383; E05B 65/006; E05B 73/00; E05B 37/025; E05B 65/0067; E05B 67/003; Y10T 70/5009; Y10T 70/40; Y10T 70/554; G06F 1/181; B41J 29/13
See application file for complete search history.

(56) References Cited

U.S. PATENT DOCUMENTS

| | | | |
|---|---|---|---|
| 7,428,835 B2* | 9/2008 | Fan | E05B 63/0017 312/223.2 |
| 8,297,088 B1* | 10/2012 | Zhang | G06F 1/182 292/150 |
| 8,922,994 B2* | 12/2014 | Zawacki | G06F 1/1683 292/30 |
| 2010/0320884 A1* | 12/2010 | Shiroishi | G06F 21/88 312/223.1 |
| 2011/0005281 A1* | 1/2011 | Lin | E05B 73/0082 70/58 |

FOREIGN PATENT DOCUMENTS

| | | |
|---|---|---|
| CN | 104411134 A | 3/2015 |
| TW | 201622513 A | 6/2016 |

* cited by examiner

*Primary Examiner* — Mark A Williams (57) ABSTRACT

A computer casing includes a housing, a retaining structure, a lock plate, and an elastic element. The retaining structure is disposed in the housing. The lock plate is movably disposed on the retaining structure. The elastic element is disposed on the lock plate, and applies an elastic force to the retaining structure to retain the lock plate in a burglar-proof position or a storage position.

15 Claims, 9 Drawing Sheets

COMPUTER CASING

CROSS-REFERENCE TO RELATED APPLICATIONS

This Application claims priority of Taiwan Patent Application No. 106107766 filed on Mar. 9, 2017, the entirety of which is incorporated by reference herein.

BACKGROUND OF THE INVENTION

Field of the Invention

The present disclosure relates to a computer casing, and in particular to a computer casing having burglar-proof mechanisms.

Description of the Related Art

In recent years, due to the progress of technology, the size of personal computers has gradually reduced, not only reducing the amount of space they occupy in users' homes, but also increasing their mobility. However, due to the small size of personal computers, the risk of their being stolen has increased.

In the conventional art, in order to respond to the needs of burglar-proofing, a protruded ring structure is added on the casing of the personal computer, so that a lock can be connected on the ring structure in order to achieve a burglar-proof function.

However, since the ring structure protrudes from the casing of the personal computer, it can easily become deformed or damaged by impacts during the handling. Consequently, it is desirable to provide a solution for improving the burglar-proof mechanism of the personal computer.

BRIEF SUMMARY OF THE INVENTION

The present disclosure provides a computer casing having burglar-proof mechanisms extending out of the housing when connected to a lock. Moreover, when the burglar-proof mechanism is separated from the lock, the burglar-proof mechanism can be retracted into the housing.

The present disclosure provides a computer casing including a housing, a retaining structure, a lock plate, and an elastic element. The retaining structure is disposed in the housing. The lock plate is movably disposed on the retaining structure. The elastic element is disposed on the lock plate, and provides an elastic force to the retaining structure. When the lock plate is located in a burglar-proof position, the locking portion is located outside of the housing, and the elastic element is configured to retain the lock plate in the burglar-proof position. When the lock plate is located in a storage position, the locking portion is located in the housing, and the elastic element is configured to retain the lock plate in the storage position.

In some embodiments, the elastic element is an elongated-bending structure. The lock plate includes a sliding hole extending along an extension axis, and the lock plate is movably disposed on the retaining structure along the extension axis.

In some embodiments, the retaining structure includes a first retaining element disposed in the housing and passing through the sliding hole; and a second retaining element disposed in the housing and passing through the sliding hole. The first retaining element and the second retaining element are arranged along the extension axis.

In some embodiments, the elastic element includes a connection portion; a first blocking portion connected to one end of the connection portion; and a second blocking portion connected to the other end of the connection portion. When the lock plate is located in the burglar-proof position, the first blocking portion abuts the first retaining element. When the lock plate is located in the storage position, the second blocking portion abuts the second retaining element.

In some embodiments, the elastic element includes a blocking portion connected to the connection portion. When the lock plate is located in the burglar-proof position, the blocking portion abuts the second retaining element. When the lock plate is located in the storage position, the blocking portion abuts the first retaining element.

In some embodiments, the first retaining element includes a sliding groove, and the lock plate is located in the sliding groove. The first retaining element includes a fixing post affixed to a side wall of the housing; and a position element disposed on the fixing post. The lock plate is located between the fixing post and the position element.

In some embodiments, the lock plate includes a holding hole, and the elastic element includes a holding end disposed on the holding hole. The area of the holding hole is greater than an area of a cross section of the holding end, and the cross section is located in the holding hole. In some embodiments, the locking portion is a locking hole.

In conclusion, the computer casing of the present disclosure includes a lock plate movably disposed on the retaining structure. The lock plate is retained in a burglar-proof position or a storage position by the elastic element disposed on the lock plate and providing an elastic force to the retaining structure. Therefore, users can pull the lock plate out from the housing or retract the lock plate into the housing as required. When the lock plate is located in the storage position, the lock plate can be prevented from being deformed or damaged by impacts during the handling.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to another element(s) or feature(s) as illustrated in the figures. The spatially relative terms are intended to encompass different orientations of the device in use or operation in addition to the orientation depicted in the figures. The shape, size, and thickness in the drawings may not be drawn to scale or simplified for clarity of discussion; rather, these drawings are merely intended for illustration.

Figure 1A:
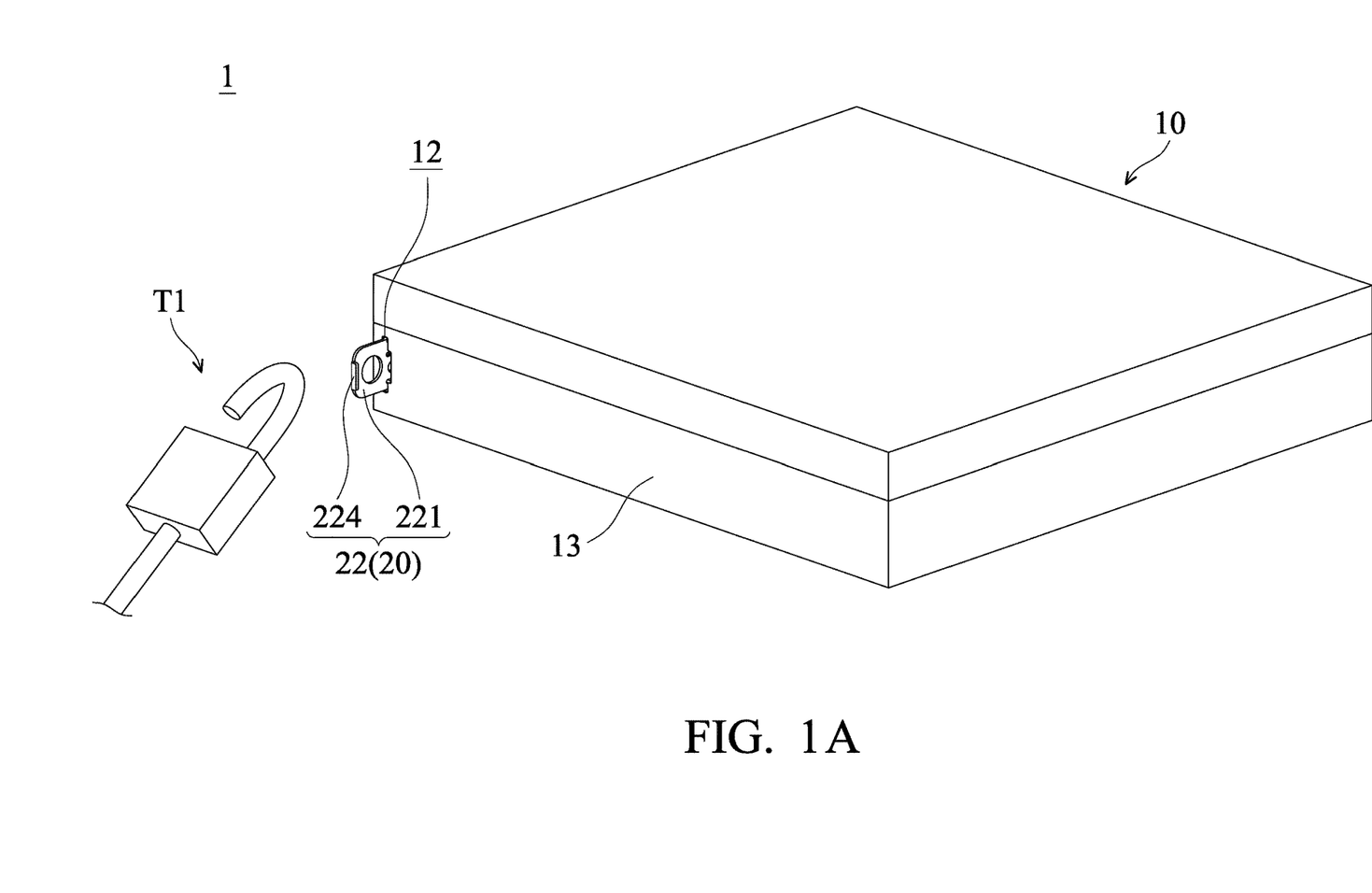
FIG. 1A is a perspective view of a computer casing in accordance with the present disclosure, wherein the burglar-proof mechanism is located in a burglar-proof position.
Figure 1B:
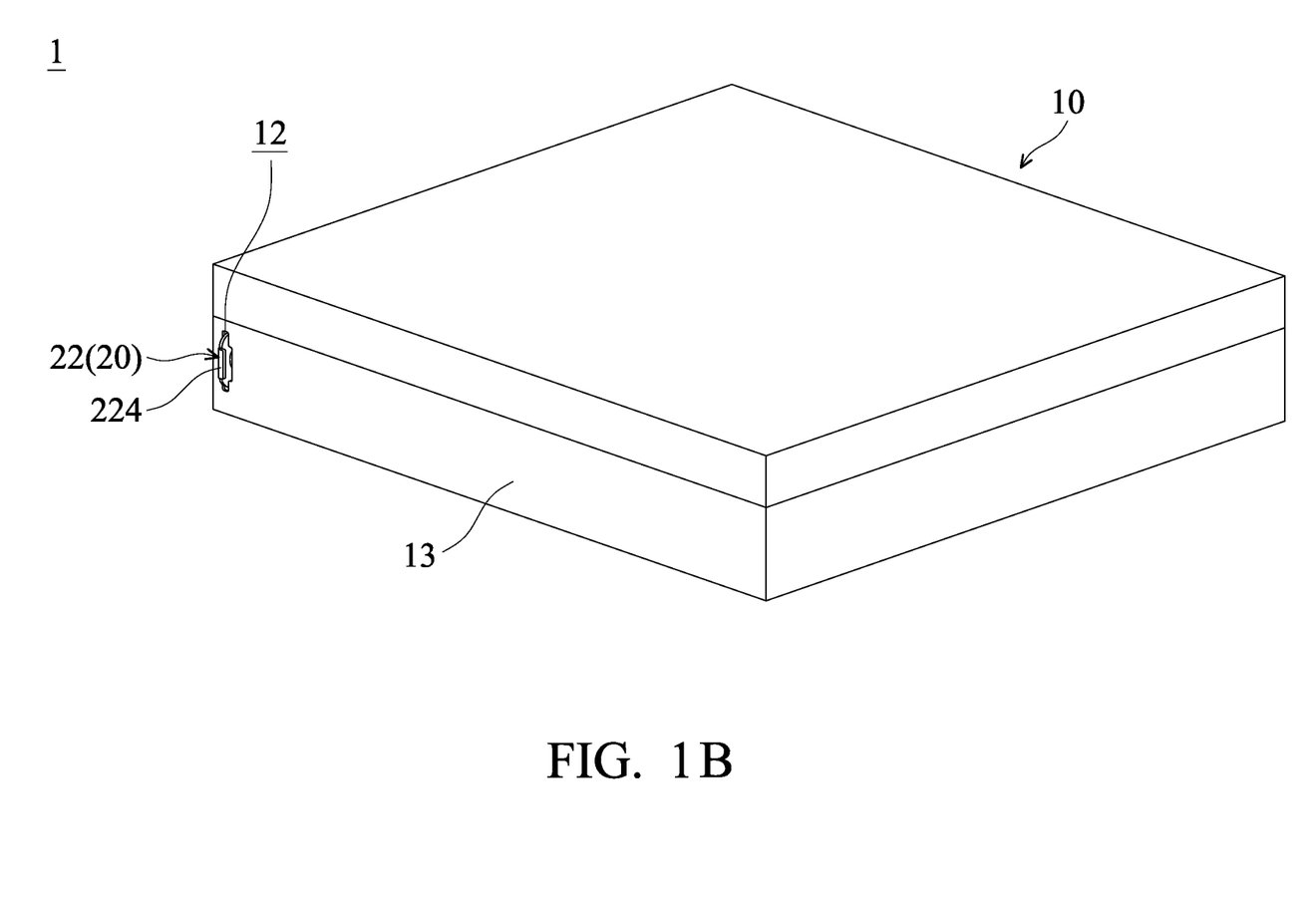
FIG. 1B is a perspective view of the computer casing in accordance with the present disclosure, wherein the burglar-proof mechanism is located in a storage position.

FIG. 1A is a perspective view of a computer casing 1 in accordance with the present disclosure, wherein the burglar-proof mechanism 20 is located in a burglar-proof position. FIG. 1B is a perspective view of the computer casing 1 in accordance with the present disclosure, wherein the burglar-proof mechanism 20 is located in a storage position. In some embodiments, some electronic elements, such as central processors, motherboards, memories, and storage devices, are disposed in the computer casing 1 so as to form a computer. The computer casing 1 includes a housing 10 and a burglar-proof mechanism 20 disposed on the housing 10. The burglar-proof mechanism 20 is configured to connect a lock T so as to prevent the computer casing 1 from being taken away by others.

In this embodiment, the burglar-proof mechanism 20 can be pulled out from the housing or retracted into the housing 10 by a user. As shown in FIG. 1A, the burglar-proof mechanism 20 is located in a burglar-proof position. When the burglar-proof mechanism 20 is pulled out from the housing 10, the lock T1 is allowed to connect to the burglar-proof mechanism 20. As shown in FIG. 1B, when the burglar-proof mechanism 20 is retracted into the housing 10, the burglar-proof mechanism 20 is prevented from damage by impacts during handling. Moreover, the appearance of the computer casing 1 can be improved.

Figure 2:
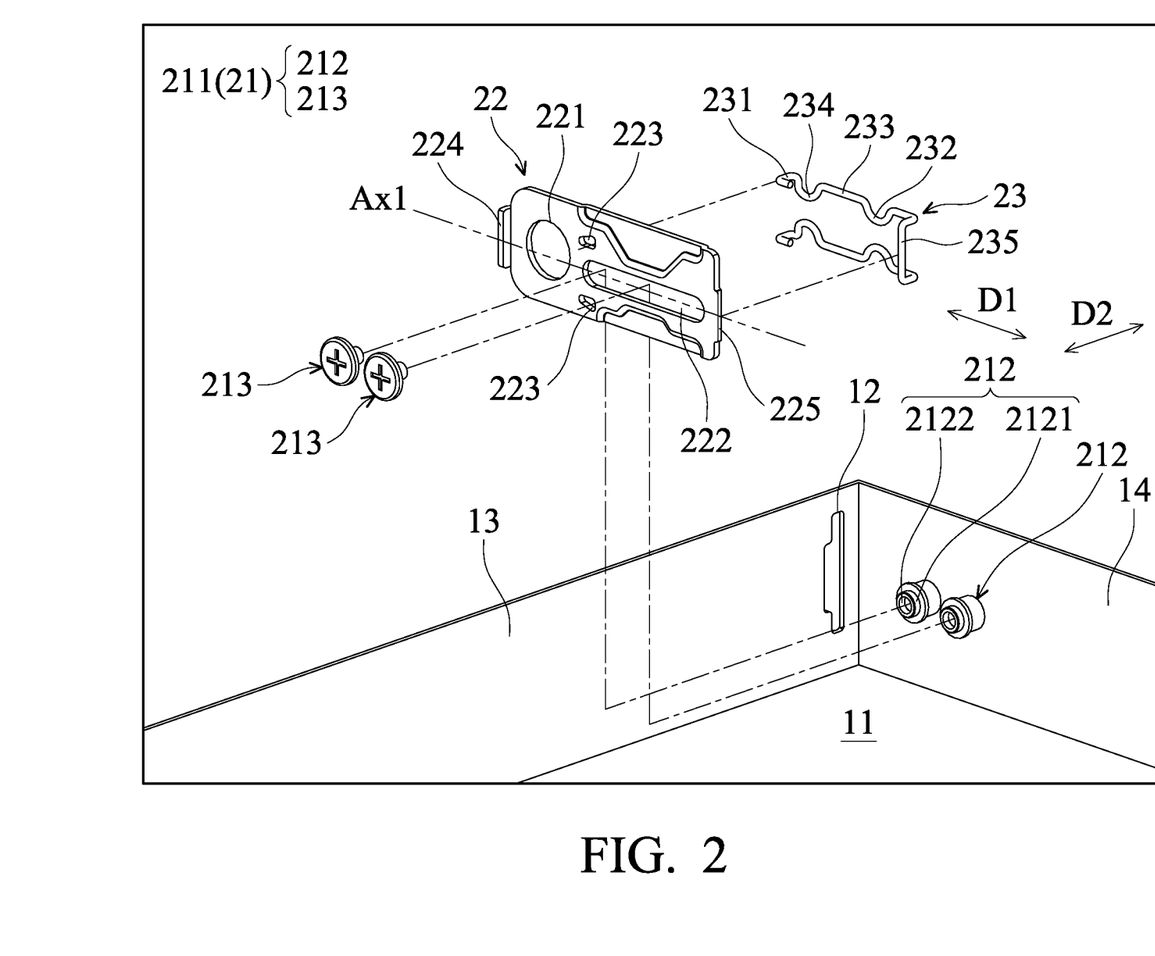
FIG. 2 is an exploded view of the computer casing in accordance with a first embodiment of the present disclosure.
Figure 3A:
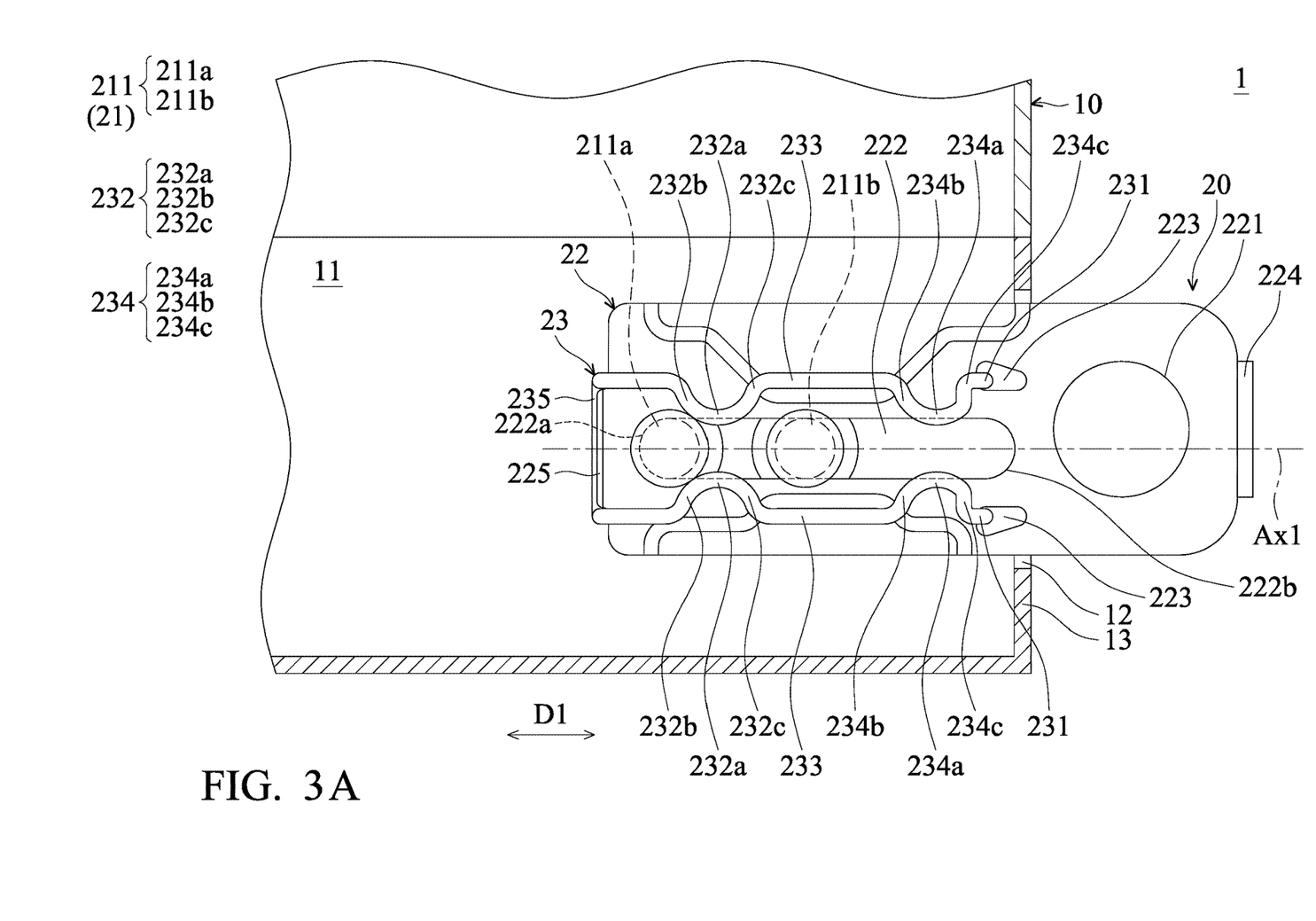
FIG. 3A is a cross-sectional view of the computer casing in accordance with a first embodiment of the present disclosure, wherein the burglar-proof mechanism is located in the burglar-proof position.

FIG. 2 is an exploded view of the computer casing 1 in accordance with a first embodiment of the present disclosure. In FIG. 2, only a portion of the housing 10 is illustrated. FIG. 3A is a cross-sectional view of the computer casing 1 in accordance with a first embodiment of the present disclosure, wherein the burglar-proof mechanism 20 is located in the burglar-proof position. The housing 10 includes a receiving chamber 11 and an opening 12. The receiving chamber 11 is located in the housing 10, and connected to the opening 12. The opening 12 is formed on a rear wall 13 of the housing 10.

As shown in FIGS. 1 to 3A, the burglar-proof mechanism 20 is located in the burglar-proof position. The burglar-proof mechanism 20 is movably disposed in the receiving chamber 11, and passes through the opening 12. The burglar-proof mechanism 20 includes a retaining structure 21, a lock plate 22, and an elastic element 23. The retaining structure 21 is disposed in the receiving chamber 11 of the housing 10.

The retaining structure 21 includes retaining elements 211 disposed in the receiving chamber 11 of the housing 10. The retaining elements 211 are arranged in the moving direction D1, and extend along a position direction D2. The position direction D2 is perpendicular to the moving direction D1. In this embodiment, there are two retaining elements 211 (a retaining element 211a and a retaining element 211b) separated from each other. In some embodiments, the retaining elements 211 are connected to each other.

Each of the retaining elements 211 includes a fixing post 212 and a position element 213. The fixing post 212 is affixed on a side wall 14 of the housing 10, and extends along the position direction D2. The side wall 14 is substantially perpendicular to the rear wall 13.

The fixing post 212 includes a sliding groove 2121 and a fixing hole 2122. The sliding groove 2121 is formed on the side wall of the fixing post 212, and may be a ring structure. The fixing hole 2122 is formed on the top surface of the fixing post 212, and extends along the position direction D2.

The position element 213 is disposed in the fixing hole 2122 of the fixing post 212, and connected to the sliding groove 2121. In this embodiment, the position element 213 may be a screw locked on the fixing post 212.

The lock plate 22 is movably disposed on the retaining structure 21. The lock plate 22 extends along an extension axis Ax1, and the retaining element 211 is arranged at the extension axis Ax1. The extension axis Ax1 is parallel to the moving direction D1. The lock plate 22 includes a locking portion 221, a sliding hole 222, holding holes 223, an operation portion 224, and a holding protrusion 225.

In this embodiment, the locking portion 221 is a lock hole. As shown in FIGS. 1 and 3A, when the lock plate 22 is located in the burglar-proof position, the lock plate 22 passes through the opening 12 of the rear wall 13, and the locking portion 221 is located outside of the housing 10. The opening 12 extends a direction perpendicular to the moving direction D1 or the extension axis Ax1 so as to limit the lock plate 22 to being inclined relative to the rear wall 13.

The sliding hole 222 may have a narrow elongated shape that extends along the extension axis Ax1. The retaining element 211 passes through the sliding hole 222, and the sliding hole 222 is located in the sliding groove 2121 of the retaining element 211. In this embodiment, the width of the sliding hole 222 is shorter than the greatest diameters of the fixing post 212 and the position element 213. Moreover, the width of the sliding hole 222 is substantially equal to the shortest diameter of the fixing post 212 at the sliding groove 2121. The width of the sliding hole 222 and the diameters of the fixing post 212 and the position element 213 are measured in a direction perpendicular to the moving direction D1.

Moreover, the sliding hole 222 has a first end 222a and a second end 222b. The first end 222a is far from the locking portion 221, and the second end 222b is adjacent to the locking portion 221. The distance between the retaining element 211a and the retaining element 211b is shorter than the length of the sliding hole 222. The length of the sliding hole 222 is measured in the moving direction D1. In other words, when the retaining element 211a is located at the first end 222a, the retaining element 211b is located between the first end 222a and the second end 222b. When the retaining element 211b is located at the second end 222b, the retaining element 211a is located between the first end 222a and the second end 222b.

According to the structure of the retaining element 211, the retaining element 211 can limit the movement of the lock plate 22 in the moving direction D1 or the extension axis Ax1.

During the assembly of the burglar-proof mechanism 20, first, the lock plate 22 is installed on the sliding groove 2121 of the fixing post 212, and then the position element 213 is disposed on the fixing post 212. Because the lock plate 22 is clamped by the fixing post 212 and the position element 213, the lock plate 22 can be simply and stably installed on the retaining structure 21.

The operation portion 224 and the holding protrusion 225 are respectively disposed on two opposite ends of the lock plate 22. The operation portion 224 is adjacent to the locking portion 221, and extends perpendicular or substantially perpendicular to the locking portion 221. The user can easily move the lock plate 22 by holding the operation portion 224.

The elastic element 23 is disposed on the lock plate 22, and configured to provide an elastic force to the retaining structure 21 so as to retain the lock plate 22 in a burglar-proof position or a storage position. The elastic element 23 can be made of metal, and may be an elongated-bending structure. In this embodiment, the elastic element 23 is substantially a U-shaped structure.

The elastic element 23 includes holding ends 231, blocking portions 232, connection portions 233, blocking portions 234, and a holding portion 235. The holding ends 231 are respectively disposed on the holding holes 223 of the lock plate 22. In this embodiment, the holding ends 231 are hook structures.

The area of the holding hole 223 is greater than two times the area of the cross section of the holding end 231. The cross section is located in the holding hole 223. Depending on the area of the holding hole 223, the elastic element 23 can be easily installed on the lock plate 22, and a greater tolerance between the elastic element 23 and the lock plate 22 is allowed.

The blocking portions 232 are connected to the holding portion 235 and the connection portions 233. As shown in FIG. 3A, the blocking portions 232 extend to a side of the sliding hole 222. One of the blocking portions 232 extends toward the other blocking portion 232.

In this embodiment, the blocking portions 232 may be V-shaped structures. The blocking portions 232 have top ends 232a, first sides 232b, and second sides 232c. One of the top ends 232a of the blocking portions 232 corresponds to the other top end 232a of the other blocking portion 232, and two top ends 232a of the blocking portions 232 are separated from each other.

The first side 232b and the second side 232c may be curved shapes. The first side 232b is connected to the top end 232a and the holding portion 235, and inclined relative to the moving direction D1. The second side 232c is connected to the top end 232a and the connection portion 233, and inclined relative to the moving direction D1.

Two ends of each of the connection portions 233 are respectively connected to one of the blocking portions 232 and one of the blocking portions 234. The connection portions 233 extend along the moving direction D1. Two connection portions 233 are substantially parallel to each other. In other words, the connection portions 233 are parallel or substantially parallel to the sliding hole 222. The distance between the connection portions 233 is greater than the widths of the sliding hole 222.

The blocking portions 234 are connected to the holding ends 231 and the connection portions 233. The structure of the blocking portions 234 are the same or substantially the same as the blocking portions 232. As shown in FIG. 3A, the blocking portions 234 extend to a side of the sliding hole 222. One of the blocking portions 234 extends towards the other blocking portion 234.

In this embodiment, the blocking portions 234 may be V-shaped structures. The blocking portions 234 have top ends 234a, first sides 234b and second sides 234c. One of the top ends 234a of the blocking portions 234 corresponds to the other top end 234a of the other blocking portion 234, and the two top ends 234a of the blocking portions 234 are separated from each other. The first sides 234b are connected to the top ends 234a and the connection portions 233, and included relative to the moving direction D1. The second sides 234c are connected to the top ends 234a and the holding ends 231, and inclined relative to the moving direction D1. In this embodiment, the distance between one of the top ends 234a of the blocking portions 234 and the other top end 234a of the blocking portion 234 is shorter than the width of the sliding hole 222.

The holding portions 235 may be U-shaped structures, and connected to the first sides 232b of the blocking portions 232. The holding portions 235 are retained on the holding protrusion 225 of the lock plate 22. The elastic element 23 is stably disposed on the lock plate 22 by the holding portion 235 hooking on the holding protrusion 225 and the holding end 231 hooking on the holding hole 223.

As shown in FIG. 3A, when the lock plate 22 is located in a burglar-proof position, the locking portion 221 is located outside of the housing 10, and the elastic element 23 is configured to retain the lock plate 22 in the burglar-proof position. Moreover, the first side 232b of the blocking portion 232 abuts the retaining element 211a, and provides an elastic force to the retaining element 211a. The retaining element 211a is retained at the first end 222a of the sliding hole 222 by the blocking portion 232. Therefore, the lock plate 22 is retained in the burglar-proof position by the elastic element 23.

The retaining element 211b is located between the first end 222a and a second end 222b of the sliding hole 222. In this embodiment, the distance between the connection portions 233 are greater than the diameters of the retaining element 211a and the retaining element 211b. Therefore, the connection portions 233 are separated from the retaining element 211a and the retaining element 211b. When the lock plate 22 is located in a burglar-proof position, the retaining element 211b is located between two connection portions 233. As shown in FIG. 3A, the retaining element 211b is separated from the blocking portion 232 and the blocking portion 234.

When the lock plate 22 is moved from the burglar-proof position to the storage position, one user can push the lock plate 22 along the moving direction. When the force to the lock plate 22 is greater than the elastic force of the elastic element 23, the elastic element 23 is deformed in elastic deformation, and the retaining element 211a passes through the located between two blocking portions 232, and the retaining element 211b passes through the located between the two blocking portions 234.

Figure 3B:
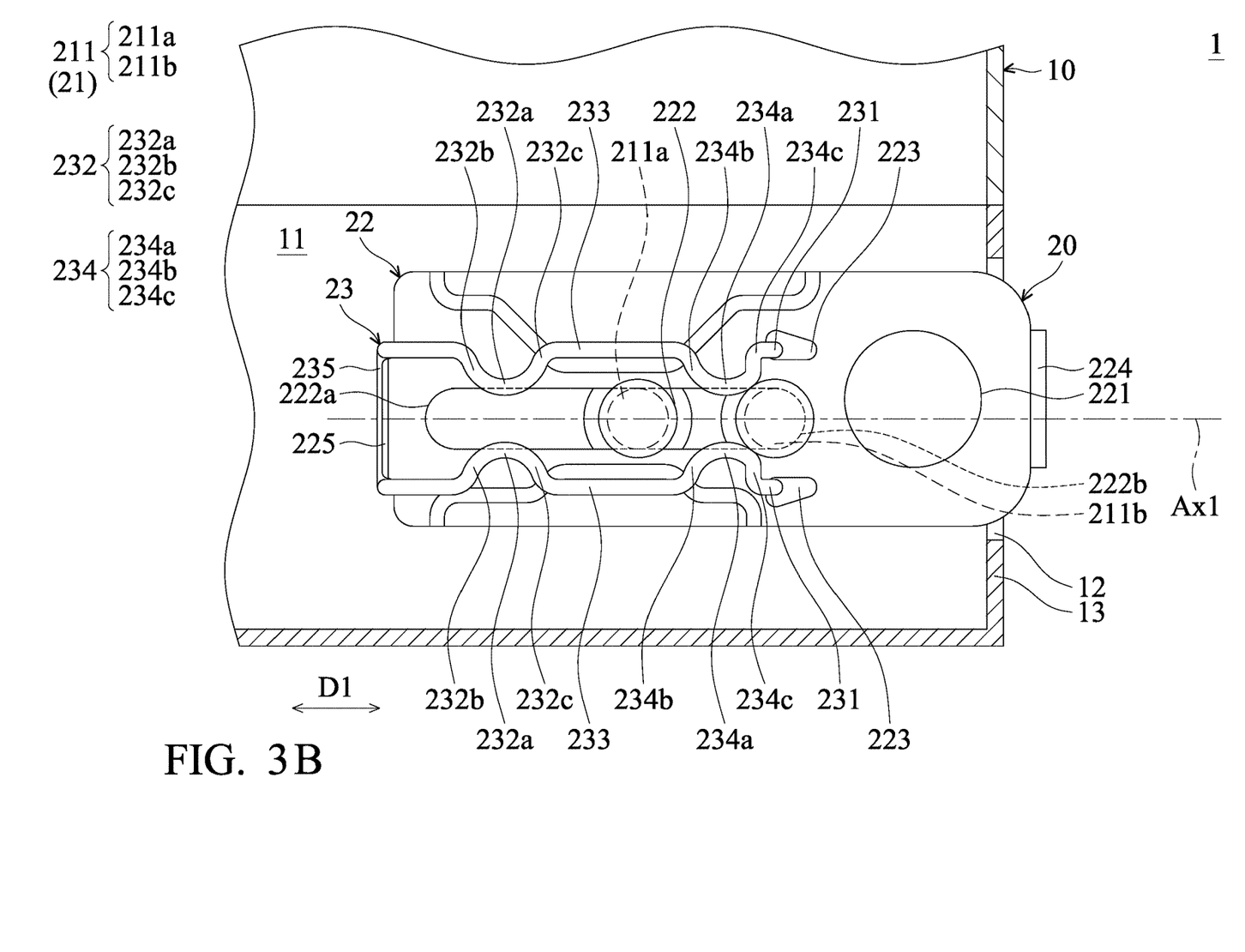
FIG. 3B is a cross-sectional view of the computer casing in accordance with the first embodiment of the present disclosure, wherein the burglar-proof mechanism is located in the storage position.

FIG. 3B is a cross-sectional view of the computer casing 1 in accordance with the first embodiment of the present disclosure, wherein the burglar-proof mechanism 20 is located in the storage position. As shown in FIG. 3B, when the lock plate 22 is located in the storage position, the locking portion 221 is located within the housing 10, and the operation portion 224 is located outside of the housing 10 and close to the opening 12. The elastic element 23 retains the lock plate 22 in the storage position. Moreover, the second side 232c of the blocking portion 234 abuts the retaining element 211b, and provides an elastic force to the retaining element 211b. The retaining element 211b is retained at the second end 222b of the sliding hole 222 by the blocking portion 234. Therefore, the lock plate 22 can be retained in the storage position by the elastic element 23.

The retaining element 211a is located between the first end 222a and the second end 222b of the sliding hole 222. When the lock plate 22 is located in the storage position, the retaining element 211a is located between the two connection portions 233. As shown in FIG. 3B, the retaining element 211a is separated from the blocking portion 232 and the blocking portion 234.

Figure 4A:
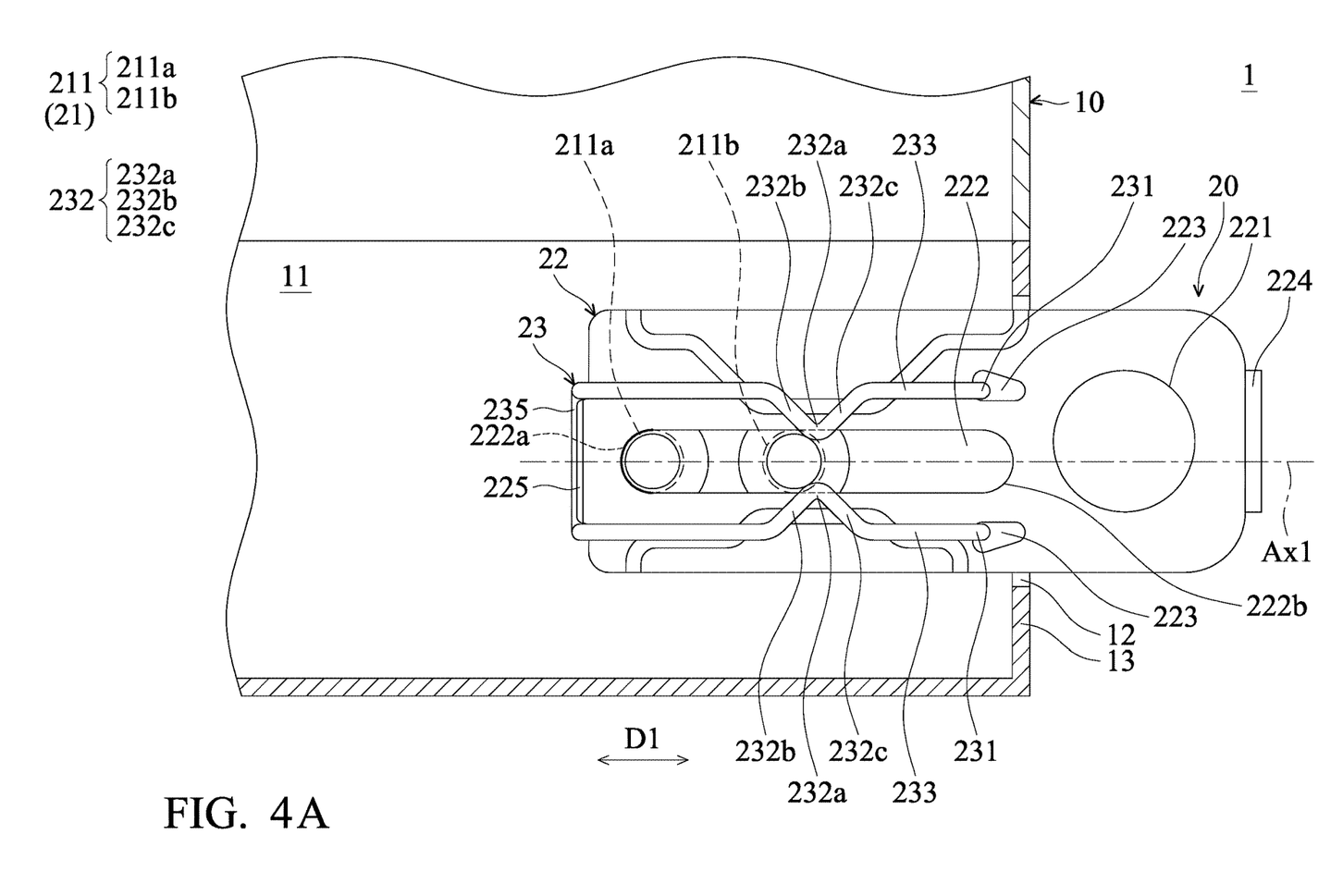
FIG. 4A is a cross-sectional view of the computer casing in accordance with the second embodiment of the present disclosure, wherein the burglar-proof mechanism is located in the burglar-proof position.

FIG. 4A is a cross-sectional view of the computer casing 1 in accordance with the second embodiment of the present disclosure, wherein the burglar-proof mechanism 20 is located in the burglar-proof position. As shown in FIG. 4A, the elastic element 23 does not include the blocking portion 234. Two ends of the connection portions 233 are connected to the blocking portion 232 and the holding end 231. The blocking portion 232 corresponds to the center area of the sliding hole 222.

When the burglar-proof mechanism 20 is located in the burglar-proof position, the retaining element 211a is located at the first end 222a of the sliding hole 222, and is separated from the elastic element 23. The retaining element 211b is located between the first end 222a and the second end 222b. Moreover, the first side 232 of the blocking portion 232 abuts the retaining element 211b. Therefore, by the structure of the sliding hole 222 and the blocking portion 232, the relative position among the lock plate 22, the retaining element 211a and retaining element 211b can be retained.

Figure 4B:
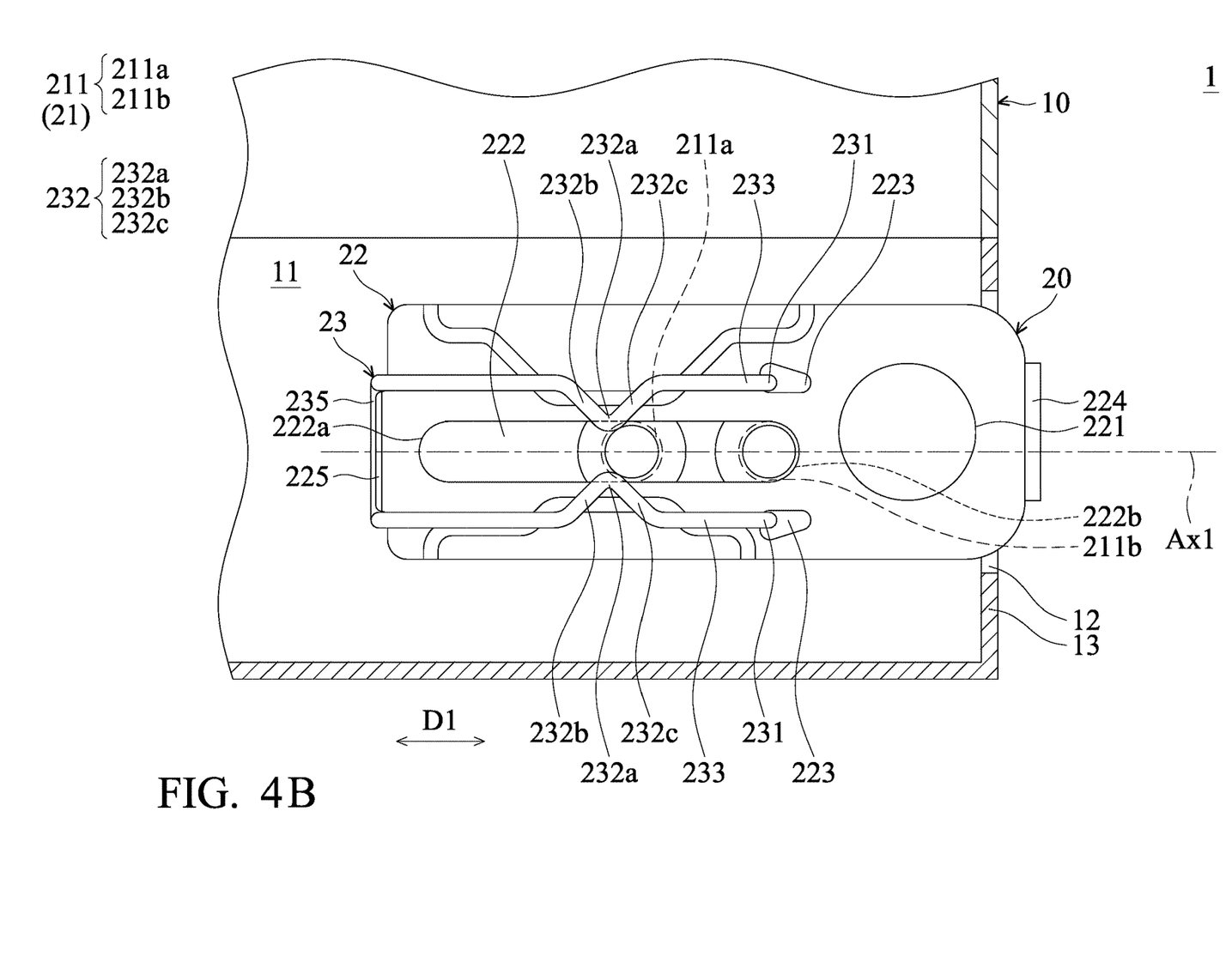
FIG. 4B is a cross-sectional view of the computer casing in accordance with the second embodiment of the present disclosure, wherein the burglar-proof mechanism is located in the storage position.

FIG. 4B is a cross-sectional view of the computer casing 1 in accordance with the second embodiment of the present disclosure, wherein the burglar-proof mechanism 20 is located in the storage position. As shown in FIG. 4B, when the burglar-proof mechanism 20 is located in the storage position, the retaining element 211b is located at the second end 222b of the sliding hole 222, and separated from the elastic element 23. The retaining element 211a is located between the first end 222a and the second end 222b of the sliding hole 222. Moreover, the second side 232c of the blocking portion 232 abuts the retaining element 211a. The relative positioning of the lock plate 22, the retaining element 211a, and the retaining element 211b is retained by the structure of the sliding hole 222 and the blocking portion 232.

Figure 5A:
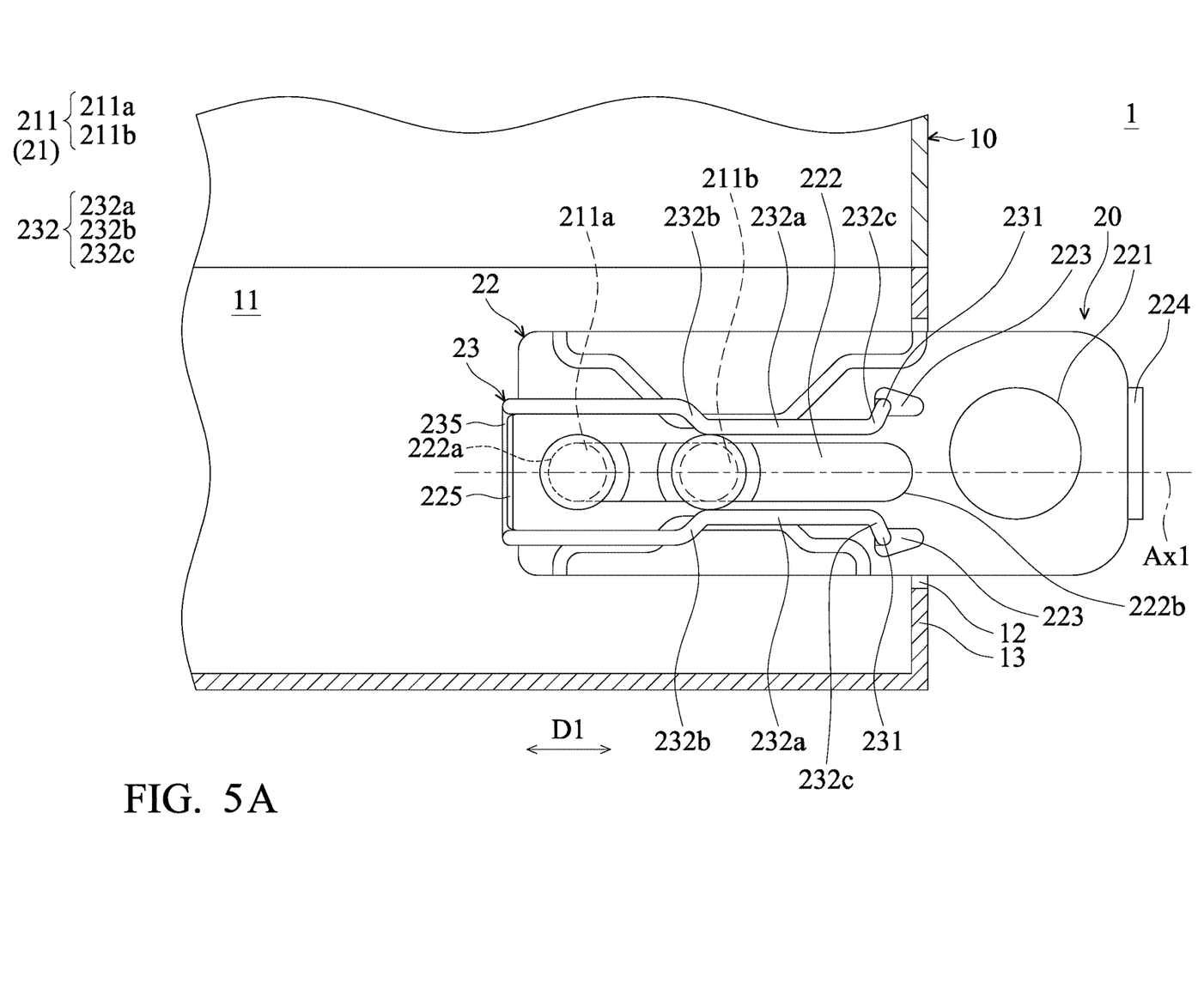
FIG. 5A is a cross-sectional view of the computer casing in accordance with the third embodiment of the present disclosure, wherein the burglar-proof mechanism is located in the burglar-proof position.

FIG. 5A is a cross-sectional view of the computer casing 1 in accordance with the third embodiment of the present disclosure, wherein the burglar-proof mechanism 20 is located in the burglar-proof position. As shown in FIG. 5A, the elastic element 23 does not include the blocking portion 234 and the connection portion 233. The top end 232a of the blocking portion 232 is a linear structure extending along the moving direction D1. Two ends of the blocking portion 232 are respectively connected to the holding end 231 and the holding portion 235. The blocking portion 232 corresponds to the center area of the sliding hole 222 and the second end 222b.

When the burglar-proof mechanism 20 is located in the burglar-proof position, the retaining element 211a is located at the first end 222a of the sliding hole 222, and separated from the elastic element 23. The retaining element 211b is located between the first end 222a and the second end 222b of the sliding hole 222. Moreover, the first side 232b of the blocking portion 232 abuts the retaining element 211b. Therefore, by the structure of the sliding hole 222 and the blocking portion 232, the relative position among the lock plate 22, the retaining element 211a, and the retaining element 211b can be retained.

Figure 5B:
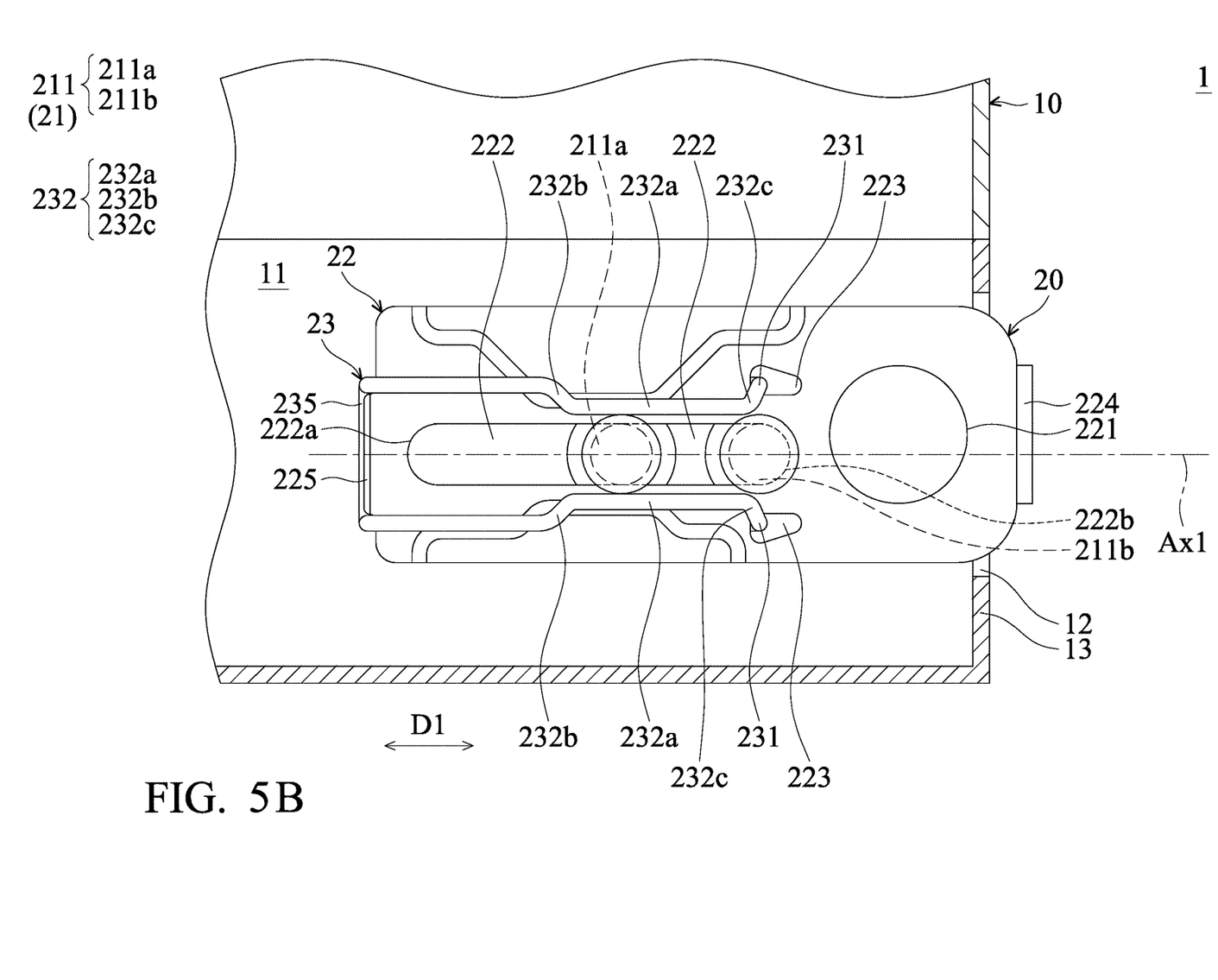
FIG. 5B is a cross-sectional view of the computer casing in accordance with the third embodiment of the present disclosure, wherein the burglar-proof mechanism is located in the storage position.

FIG. 5B is a cross-sectional view of the computer casing 1 in accordance with the third embodiment of the present disclosure, wherein the burglar-proof mechanism 20 is located in the storage position. As shown in FIG. 5B, when the burglar-proof mechanism 20 is located in the storage position, the retaining element 211b is located at the second end 222b of the sliding hole 222, and abuts the second side 232c of the blocking portion 232. Moreover, the retaining element 211a is located between the first end 222a and the second end 222b of the sliding hole 222, and the two top ends 232a of the blocking portions 232 abut the retaining element 211a. Therefore, by the structure of the sliding hole 222 and the blocking portion 232, the relative position among the lock plate 22, the retaining element 211a and the retaining element 211b can be retained.

In conclusion, the computer casing of the present disclosure includes a lock plate movably disposed on the retaining structure. The lock plate is retained in a burglar-proof position or a storage position by the elastic element disposed on the lock plate and providing an elastic force to the retaining structure. Therefore, users can pull the lock plate out from the housing or retract the lock plate into the housing as required. When the lock plate is located in the storage position, the lock plate can be prevented from being deformed or damaged by impacts during handling.

The disclosed features may be combined, modified, or replaced in any suitable manner in one or more disclosed embodiments, but are not limited to any particular embodiments.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer casing, comprising:
a housing having an opening;
a retaining structure disposed in the housing;
a lock plate disposed on the retaining structure and slidable through the opening, the lock plate comprising a locking portion and a sliding hole, wherein the lock plate extends along an extension axis, the sliding hole is elongated in form and extends along the extension axis, and the lock plate is at least partially supported and slidably disposed on the retaining structure along the extension axis; and
an elastic element disposed on the lock plate, the elastic element being an elongated-bending structure extending generally along the same direction as the extension axis;

a configuration of the housing, the retaining structure, the lock plate, and the elastic element being arranged such that when the lock plate is located in a first position, the locking portion is located in the housing and the elastic element is configured to provide an elastic force to the retaining structure so as to retain the lock plate in the first position, and when the lock plate is located in a second position after sliding through the opening, the locking portion is located outside of the housing so as to be connectable to a lock;

wherein the retaining structure comprises:
- a first retaining element, disposed in the housing, passing through the sliding hole, the first retaining element configured to engage one or more blocking portions of the elastic element for retaining the lock plate; and
- a second retaining element, disposed in the housing, passing through the sliding hole, the second retaining element configured to engage one or more blocking portions of the elastic element for retaining the lock plate; and
- wherein the first retaining element and the second retaining element are arranged along the extension axis.

2. The computer casing as claimed in claim 1, wherein the elastic element comprises:
- a connection portion;
- a first blocking portion connected to an end of the connection portion; and
- a second blocking portion connected to another end of the connection portion;
- wherein when the lock plate is located in the second position, the first blocking portion abuts the first retaining element,
- wherein when the lock plate is located in the first position, the second blocking portion abuts the second retaining element.

3. The computer casing as claimed in claim 1, wherein the elastic element comprises a blocking portion connected to the connection portion,
- wherein when the lock plate is located in the second position, the blocking portion abuts the second retaining element, and when the lock plate is located in the first position, the blocking portion abuts the first retaining element.

4. The computer casing as claimed in claim 1, wherein the first retaining element comprises a sliding groove, and the lock plate is located in the sliding groove.

5. The computer casing as claimed in claim 1, wherein the first retaining element comprises:
- a fixing post, affixed to on a side wall of the housing; and
- a position element disposed on the fixing post,
- wherein the lock plate is located between the fixing post and the position element.

6. The computer casing as claimed in claim 1, wherein the lock plate comprises a holding hole, and the elastic element comprises a holding end disposed in the holding hole.

7. The computer casing as claimed in claim 6, wherein an area of the holding hole is greater than an area of a cross section of the holding end, and the cross section is located in the holding hole.

8. The computer casing as claimed in claim 1, wherein the lock plate comprises a holding protrusion, and the elastic element comprises a holding portion holding on the holding protrusion.

9. The computer casing as claimed in claim 1, wherein the locking portion comprises a lock hole adapted to connect with the lock.

10. The computer casing as claimed in claim 1, arranged such that when the lock plate is moved between the first and second positions, the locking portion passes through the opening.

11. The computer casing as claimed in claim 1, arranged such that the elastic element provides elastic force to the retaining structure so as to retain the lock plate in the second position.

12. A computer casing, comprising:
- a housing having an opening;
- a retaining structure disposed in the housing;
- a lock plate disposed on the retaining structure and slidable through the opening, the lock plate comprising a locking portion and a sliding hole, wherein the lock plate extends along an extension axis, the sliding hole is elongated in form and extends along the extension axis, and the lock plate is at least partially supported and slidably disposed on the retaining structure along the extension axis; and
- an elastic element disposed on the lock plate, the elastic element being an elongated-bending structure extending generally along the same direction as the extension axis;
- a configuration of the housing, the retaining structure, the lock plate, and the elastic element being arranged such that when the lock plate is located in a first position, the locking portion is located in the housing and the elastic element provides an elastic force to the retaining structure so as to retain the lock plate in the first position;

wherein the retaining structure comprises:
- a first retaining element disposed in the housing and passing through the sliding hole, the first retaining element configured to engage one or more blocking portions of the elastic element for retaining the lock plate; and
- a second retaining element disposed in the housing and passing through the sliding hole, the second retaining element configured to engage one or more blocking portions of the elastic element for retaining the lock plate; and
- wherein the first retaining element and the second retaining element are arranged along the extension axis.

13. The computer casing as claimed in claim 12, wherein the lock plate comprises a holding protrusion, and the elastic element comprises a holding portion holding on the holding protrusion.

14. The computer casing as claimed in claim 12, wherein the locking portion comprises a lock hole adapted to connect with the lock.

15. The computer casing as claimed in claim 12, arranged such that when the lock plate is moved between the first and a second position, the locking portion passes through the opening.

* * * * *